Nov. 13, 1962
T. R. REIFF
3,063,288
METHOD AND APPARATUS FOR MEASUREMENT
OF COLLOID OSMOTIC PRESSURES
Filed April 8, 1959
2 Sheets-Sheet 1
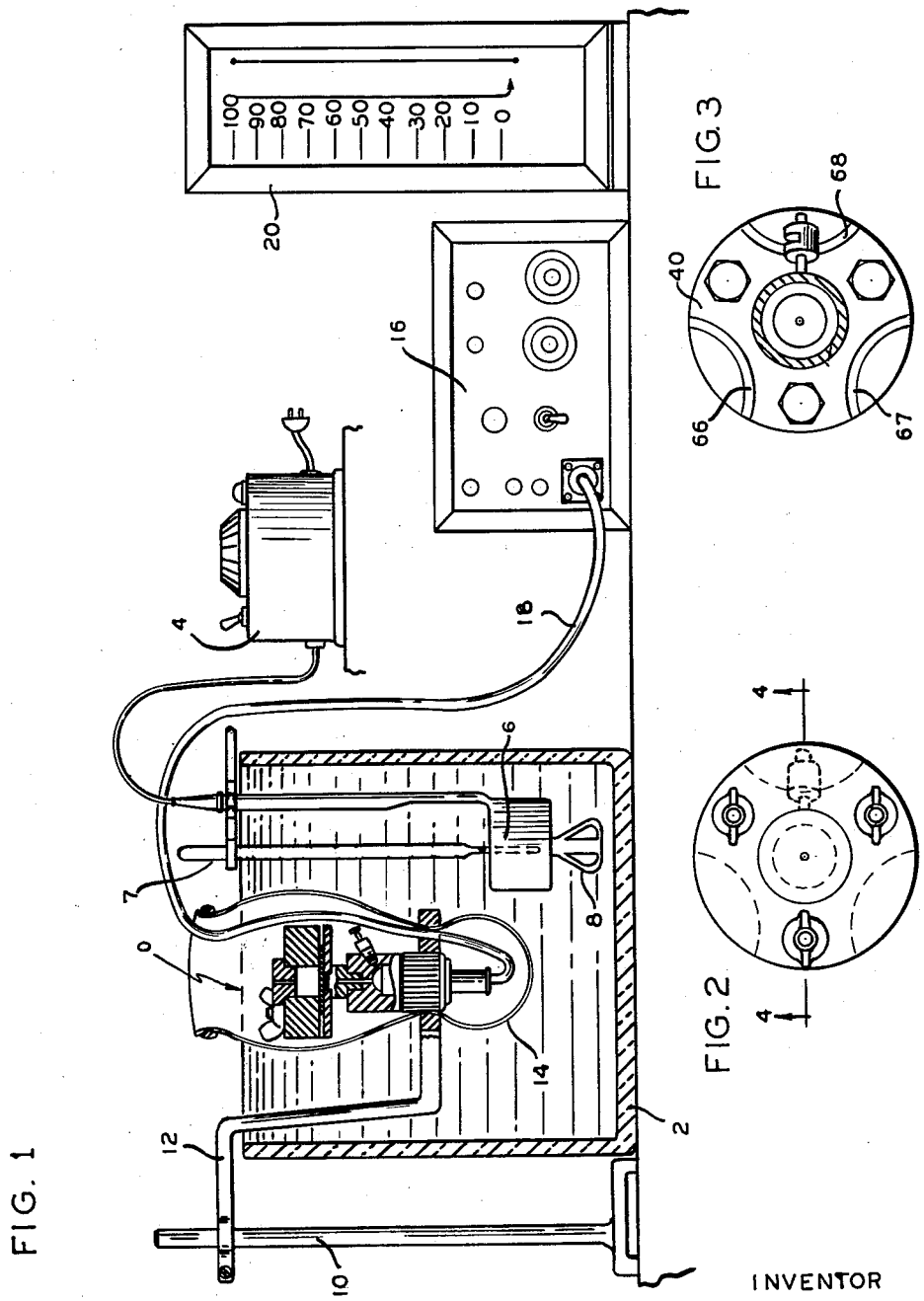
INVENTOR
Theodore R. Reiff
BY
ATTORNEY Nov. 13, 1962

T. R. REIFF 3,063,288

METHOD AND APPARATUS FOR MEASUREMENT
OF COLLOID OSMOTIC PRESSURES

Filed April 8, 1959

INVENTOR
Theodore R. Reiff
BY
Monroe J. Hamilton
ATTORNEY

3,063,288
Patented Nov. 13, 1962

3,063,288
METHOD AND APPARATUS FOR MEASUREMENT OF COLLOID OSMOTIC PRESSURES
Theodore Robert Reiff, 59 Alton Place, Brookline, Mass.
Filed Apr. 8, 1959, Ser. No. 805,039
6 Claims. (Cl. 73—53)

This invention relates in general, to osmometers and methods of measuring osmotic pressures, reference being had in particular to the measurement of colloid osmotic pressures of solutions of substances with relatively high molecular weights such as are of interest to workers in the biological and physico-chemical fields.

Osmometers presently known in the art are subject to a number of limitations which detract materially from the efficiency of conventional methods for measuring oncotic (colloid osmotic) pressures. For example, in dealing with osmotic studies of biological fluids, measurements by conventional methods are found to require an excessive amount of time and involve handling of undersirably large sample volumes. In addition, there is a need for maintaining constant temperature control and for maintaining proper membrane characteristics. Earlier osmometers have not been of an automatic nature, but on the contrary have in use required frequent balancing with an externally applied hydraulic pressure. It is, therefore, a general object of the invention to deal with the problems noted and to improve methods and apparatus for measuring osmotic pressure. More specifically, it is an object of the invention to devise a rapid colloid osmometer, which is capable of dealing with solutions of substances having high molecular weights. Another object is to devise a colloid osmometer which is characterized by feature of automatically coming to a state of equibrium in a very short time interval. Still another object is to devise a method and apparatus for measuring colloid osmotic pressures whereby a series of samples may be evaluated in relatively rapid succession, utilizing the same membrane element for all of these determinations.

With the foregoing objectives in mind, I have conceived of a novel technique and osmometer apparatus for rapid automatic measurement of colloid osmotic pressures of solutions of substances having relatively high molecular weights. My improved technique and process of pressure measurement, is based on the principle of recording a rapidly induced pressure change, generated in a closed solvent chamber by passage of solvent through a semi-permeable membrane, into a solution chamber which is open to atmospheric pressure. Highly important in this method of measuring oncotic pressure is (a) the establishment of relatively great rigidity in the semi-permeable membrane and
(b) the combination of the rigidly held members with closely coupled system for transmitting pressure.

In this connection, I have devised a closely coupled system which includes a pressure transducer having a transducer diaphragm; a closed solvent chamber, one side of which is comprised by the transducer diaphragm; a uniquely supported and rigidly fixed semi-permeable membrane which communicates with the solvent chamber; and finally, a solution container whose base comprises a membrane retaining surface and whose solution receptacle is arranged so that passage of solvent from the closed solvent chamber through the semi-permeable membrance into the solution chamber causes a reduction in pressure within the closed solvent chamber.

In this closely coupled system, the extreme rigidity of the membrane provided by its supporting structure cooperates with the closed solvent chamber to produce a controlled reduction in pressure in the solvent chamber, at the time that a change in volume takes place in response to osmotic pressure.

I have also discovered that with a closely coupled system and sufficiently rigidly held membrane, the reduction in pressure results in a displacement of the transducer diaphragm and enables the diaphragm to be compressed slightly into the solvent chamber by atmospheric pressure acting on the underside of the diaphragm. The displacement of the diaphragm is proportional to the change in pressure upon in occurring within the closed solvent chamber and this displacement may be employed to activate an electrical circuit that records displacement in terms of current calibrated directly against pressure.

I have also determined as an important feature of the invention, that change in volume relative to change in pressure within the closed solvent chamber is very small, so that equilibrium of solution osmotic pressure with pressure change within the closed solvent chamber may be reached rapidly without significant dilution of solution by passage of solvent into it.

In order to provide the essential rigidity required in a membrane element for use in the closely coupled system described above, I have devised a special membrane support which comprises a relatively large annular supporting surface extending in a plane passing through the outlet of the solvent chamber at right angles to the axis of this passageway. By means of this special membrane support properly organized and combined with a solvent chamber and a solution container as hereinafter described in detail, I am enabled to locate a relatively small diameter column of solvent immediately below the semi-permeable membrane which is rigidly supported throughout its entire undersurface, except at the area in contact with the column of solvent. I am further enabled to locate a relatively large diameter column of solution to be analyzed above the semi-permeable membrane in coaxial relationship to the column of solvent and directly in contact with a relatively large surface of rigidly supported membrane.

The nature of the invention and its objects and novel features will be more fully understood and appreciated from the following description of preferred embodiments of the invention selected for purposes of illustration and shown in the accompanying drawings in which:

FIG. 1 is a diagrammatic view showing the osmometer structure of the invention partly in cross section and associated with electrical control equipment and a recording device for denoting measured values;

FIG. 2 is a plan view of the osmometer structure shown in FIG. 1, but removed from the water bath enclosure noted in FIG. 1;

FIG. 3 is a bottom plan view of the osmometer member;

Figure 5:
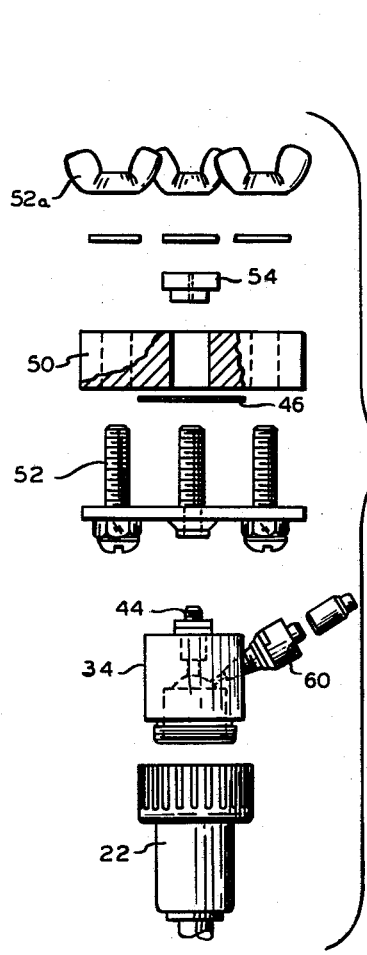
FIG. 5 is an exploded view showing the various components of the osmometer structure in separated relationship.

Referring more in detail to the drawings, FIG. 1 illustrates diagrammatically a typical form of apparatus employed in carrying out the method of the invention. This apparatus includes, in general, the special osmometer construction referred to above, supported in a temperature controlled water bath; a control unit for furnishing a voltage to the transducer section of the osmometer; and a recording unit hereinafter described more in detail.

Numeral 2 denotes the water bath member in which water may be heated and maintained in the usual way at a constant temperature. For this purpose I may employ any suitable means well known in the art, such as a constant temperature circulator 4, having a combined immersion heater 6 and thermometer 7 and a pump 8. At one side of the water bath member 2, is a stand 10, having a bracket 12, which is adapted to clamp around and support a soft plastic casing 14, in which is contained the osmometer structure of the invention generally indicated by the arrow "O."

At the right hand side of the water bath 2, as shown in FIGURE 1, is a control unit 16, which is adapted to furnish D.C. voltage through an electrical conductor 18, which is protected by its own plastic sheath. The conductor is passed inside of the protected casing 14 and connected to the transducer section of the osmometer as noted. The conduit 18 may also include electrical conductors, which carry resistance changes from the transducer portion of the osmometer "O," back to the control unit, where they are employed to actuate a recorder 20. The recorder 20 and the control unit 16, are of conventional nature and being well known in the art, are believed to require no detailed description at this point.

However, it should be understood that the control unit has an electrical calibrator of some well known type which has previously been standardized by a known hydrostatic pressure applied to the osmometer through the side arm of the solvent chamber.

Figure 4:
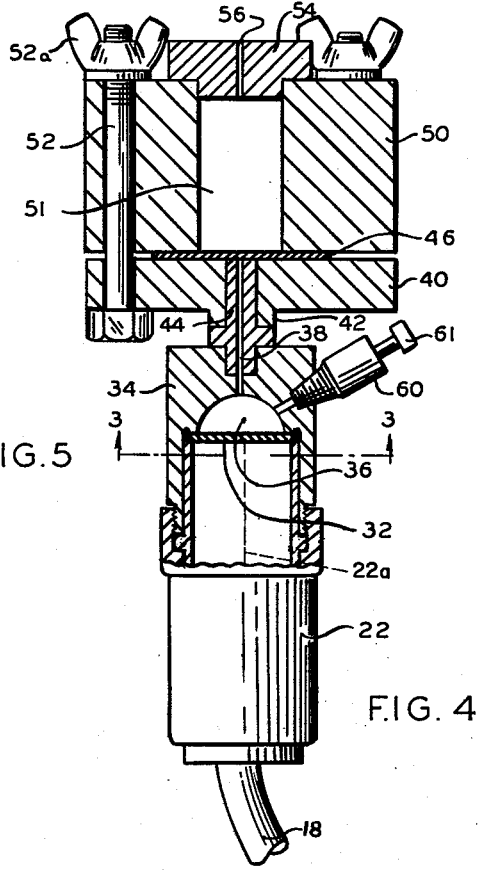
FIG. 4 is a cross section taken approximately on the line 4—4 of FIG. 2.

Attention is directed to FIGURE 4, in which the transducer portion of the osmometer is denoted by numeral 22. This transducer portion includes a housing into the lower end of which is connected the conduit 18. Within the housing 22 are contained conventional pressure transducer components, consisting of a stationary frame 24, and a strain gauge 26 comprising a plurality of resistance wire elements 28 and 30, secured between the frame and the diaphragm 32. A connection indicated by dotted line 22a transmits the movement of the diaphragm 32 to the strain gauge shown in FIG. 6 so that appropriate readings may be made.

Figure 6:
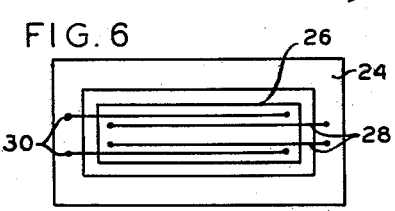
FIG. 6 is a diagram of strain gauge means employed in the transducer portion of the osmometer structure shown in FIG. 4.
Figure 7:
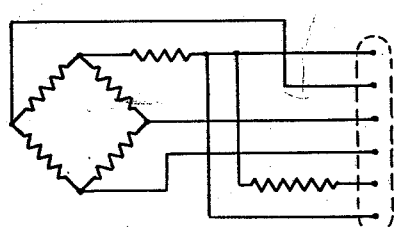
FIG. 7 is a diagrammatic view showing a typical wiring arrangement for the potentiometer section of the transducer member.
Figure 8:
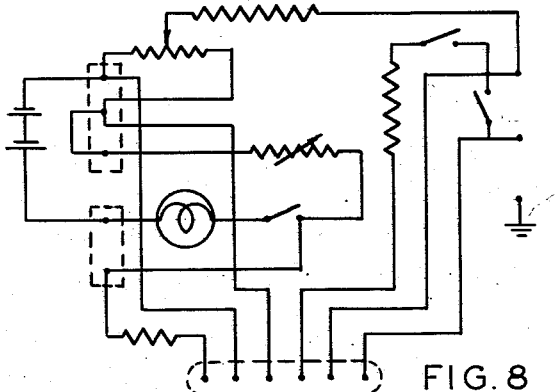
FIG. 8 is another wiring view showing the circuit for reflecting resistance changes which are utilized to represent measured osmotic pressures.

As is well known in devices of this nature, moving the wires of the strain gauge 26, for example, in the direction from right to left, as shown in FIGURE 6, will elongate the resistance wires 28 and reduce the length of wires 30. This change will produce electrical resistance changes in the Wheatstone bridge arrangement shown in FIG. 7. These changes produce an electrical output which is led into the control unit 16 through a circuit such as that noted in FIGURE 8 and this actuates the recorder 20. Movement of the strain gauge 26, is produced by means of a diaphragm 32, which has been indicated diagrammatically in FIGURE 4 and which is connected by an arm, or other suitable connecting means, to the strain gauge 26. It is pointed out that a customary arrangement in pressure transducers of this nature is a flexible mounting for the diaphragm 32, so that it may yieldably resist pressure exerted at either side thereof. In the structure described, the strain gauge and frame are sufficiently open for atmospheric pressure to be exerted at the underside of the diaphragm 32, as viewed in FIGURE 4.

Attached to the housing 22, is a pressure dome 34, which is formed with a solvent chamber 36. It will be observed that the diaphragm 32 comprises one side of the solvent chamber and, therefore, may yield slightly to pressure exerted by a solvent when the chamber 36 is filled with solvent. At its upper surface, the pressure dome is formed with a restricted passageway 38, which provides for maintaining a column of solvent of relatively small diameter when the solvent chamber is filled.

In accordance with the invention, I combine with the structure above described, a membrane support 40 which preferably comprises an annular rigid metal plate of brass, or other suitable metal. The plate may be formed with a boss 42 which is adapted to fit snugly against the upper reduced end of the pressure dome 34, as shown in FIGURE 4. The upper surface of the membrane support 40 is arranged to lie in a plane which bounds the end of the restricted passageway 38 and which extends at right angles to the axis of this passageway. As will be noted from an inspection of FIGURE 4, in one desirable arrangement, a threaded member 44 surrounds the restricted passageway 38 and securely retains the membrane support 40 in the relative position illustrated. The upper surface of the membrane support, as well as that of the threaded member 44, are highly polished to provide a smooth finish for receiving a membrane.

Numeral 46 denotes a membrane element which is of a size corresponding to the size of the membrane support 40 and which is substantially greater in diameter than the diameter of the transducer housing 22.

It will be apparent, therefore, that almost the entire undersurface of the membrane 46 is firmly received against a solid retaining surface with the exception of the very small area which overlies the aperture comprised by the end of the passageway 38. It will be appreciated that by tightly pressing the membrane 46 against the membrane support 40 over this relatively large supporting area, there necessarily results a very considerable stiffening of the diaphragm so that the small area which does overlie the passageway 38, has very little yieldability.

In order to secure the membrane against the membrane support, I may, in one preferred form of the invention, utilize a special solution container member 50, which is of cylindrical form. The outer diameter of this solution container may correspond to the outer diameter of the membrane support 40. The central section of the solution container 50 is recessed to provide a cylindrical aperture for retaining a solution to be analyzed and this aperture, denoted by the numeral 51, is preferably of a size appreciably greater than the restricted passageway 38, but of a diameter considerably less than the over all diameter of the member 50.

Thus, there is left a relatively large annular bearing surface at the bottom of the member 50, which is available to be clamped against the upper surface of the membrane to hold it in the rigid state earlier described. For purposes of securing the member 50, I may employ threaded fastenings as 52, which extend through the members 40 and 50 and are tightly held by wing nuts 52a, or other suitable clamping means. It is pointed out that with the relative proportions described, the solution recess 51 is much greater in diameter than the passageway 38 and, therefore, a relatively large diameter column of solution may be maintained immediately above the membrane, and thus is realized a relatively large diffusion surface from which solvent entering the membrane may be released into a solution in the recess in response to osmotic pressure. I find that the relatively large diffusion surface thus provided tends to reduce the period required for a small volume of solvent to pass into the solution in response to osmotic pressure. It will, of course, be apparent that the volume of the solution recess 51 may be varied as desired to accommodate varying sample volumes desired to be analyzed.

The recess 51 may, in accordance with the invention, be closed by means of a fitted plug 54 which functions to prevent evaporation. The plug 54 is formed with a central opening 56 to furnish access for atmospheric pressure to be exerted on a volume of solution in the recess 51. Similarly, I may provide means for introducing solvent into the solvent sample independently of the passageway 38. For this purpose I provide a side adapter 60, which is threaded into the pressure dome 34, as shown in drawings. By means of this arrangement solvent may be rendered free from air bubbles and calibration may be carried out. To facilitate angular disposition of the side adapted 60 in the pressure dome, I may also provide for the membrane support 40 being cut away to provide relieved edges as indicated at 66, 67 and 68.

In preparing the osmometer structure of the invention for use, the following procedure may be followed. The pressure dome 34 is attached to the membrane support 40 and immersed in a volume of a solvent to be used in an oncotic determination and filled to the exclusion of all air. Care is exercised in removing any air bubbles which remain in the dome by flushing the air bubbles away with a syringe attached at the end of the adapter 60. With air completely removed from the pressure dome, and the passageway 38, a cap 61 is tightly secured to the adapter 60.

Thereafter, the pressure transducer member is immersed in the body of solvent and the upper section of the transducer is firmly screwed about the base of the pressure dome with the diaphragm 32 assuming the position shown in FIGURE 4. Here also care is exercised to remove air bubbles. The assembled transducer element and pressure dome is then removed from the body of solvent and the membrane 46 is placed on the membrane support 40 with care being exercised to insure that all air bubbles are completely excluded from under the membrane and with the membrane itself being kept moist at all times. Thereafter, the solution container 50 is mounted over the diaphragm and firmly secured against the membrane and membrane support 40 by means of threaded fasteners 52 and wing nuts 52a. Then a plastic cover is installed as shown in FIG. 1.

The apparatus is then ready to be calibrated. A zero base line is obtained on the recorder 20 utilizing pure solvent in the solution recess 51. After the zero base line is obtained the solution recess 51 is cleared of all solvent, a procedure which may be accomplished, for example, by utilizing filter paper strips. Then, a sample of solution to be analyzed is placed in the chamber with care being exercised to introduce a volume of solution equal to the volume of solvent initially in the solution recess 51 when the zero base was obtained. Typical samples are those of from 0.5 to as low as 0.1 cm.$^3$. A small quantity of the sample solution may also be placed on the underside of the cap 54, which tends to prevent evaporation loss of solvent from the solution in the recess 51 to the cap 54. Thereafter, the cap 54 is inserted.

Immediately osmotic pressure operates to force a small volume of solvent from the solvent chamber 36 through the passageway 38 and across the membrane 46, into solution 51. This action produces a displacement of the diaphragm 32. It is believed that the displacement occurs by reason of atmospheric pressure acting on the underside of the diaphragm and forcing the diaphragm inwardly against the solvent volume remaining in the solvent chamber.

Displacement of the diaphragm 32 actuates the strain gauge 26 and in turn produces a change in resistance of the wire elements in the transducer and the change in resistance is received by the control unit and recorded by the member 20 on the scale shown therein. The first determination from the zero base line utilizing a sample of the volume indicated, may take from 15 to 20 minutes.

If it is desired to carry out serial determinations of solutions with similar solvents, all that is necessary is to remove a measured solution from the recess 51, flush the recess a few times with solvent, blot it dry with filter paper and then add the new samples. I find that serial determinations may be accomplished within a few minutes following the first determination and I further find that the membrane 46 becomes set and adjusted to the osmometer structure so that it is satisfactory for continuous use. Membranes which I have found satisfactory are commercially prepared and may consist of well known products prepared from pure cellulose. By reason of the special means devised for supporting the membrane and imparting rigidity to it, it is found that a single membrane may be used for many determinations without difficulty.

From the foregoing description, it will be apparent that I have provided a greatly improved method and apparatus for osmotic pressure determinations. The method can be rapidly carried out and becomes to a large extent automatic once an initial sample has been handled. That is to say, no balancing of oncotic pressure with an externally applied pressure is necessary, as is the case with prior art devices.

By means of the recording device utilized, a complete pressure-time tracing of the approach to equilibrium is obtained, so that the course of measurement may be followed during the actual run. A series of determinations may be accurately and quickly carried out. Moreover, apparatus is capable of making semi-micro determinations on volumes from 0.5 to 0.1 cm.$^3$. Smaller solution volumes may be dealt with by reducing the volume of the solution chamber.

While I have shown a preferred embodiment of the invention, it should be understood that changes and modifications may be resorted to within the scope of the appended claims.

What is claimed is:

1. A rapid automatic colloid osmometer comprising an electro-mechanical device capable of transducing mechanical displacement to changes in electrical resistance of sensitive resistance wire of a strain gauge, said electro-mechanical device including a stationary frame, a strain gauge having a part supported for limited travel in the frame, a pressure sensitive diaphragm having one face operatively connected to said strain gauge, an enclosure body for receiving a solvent liquid in contact with the other face of said diaphragm, said enclosure body being formed with a restricted passageway through which the solvent may pass, a membrane supporting element having a continuously uninterrupted upper planar face, said supporting element being positioned above and upon said enclosure body, said membrane supporting element being formed with a restricted central aperture in registry with the said restricted passageway in the enclosure body, a semi-permeable membrane element having its medial portion overlying said central aperture and having a relatively large bottom surface in normal contact with the continuously uninterrupted planar face, a solution container tightly received against the other surface of the membrane and being fixedly secured to said membrane supporting element and cooperating with the membrane supporting element to hold the membrane in a rigid state, said solution container being constructed with a centrally located solution chamber which is coaxial with the aperture of the membrane supporting element, and closure means for said chamber having a vent for admitting atmospheric pressure to the solution contained therein.

2. A structure according to claim 1, including adjustable fastening means for tightly securing the solution container against the membrane.

3. An apparatus according to claim 1 in combination with a means supplying input voltage to the said electro-mechanical device, and a recording unit for recording changes in resistance induced by displacement of the diaphragm when solvent passes from the solvent chamber through the membrane and into the solution chamber.

4. A structure according to claim 1 in which the solvent chamber includes inlet means for introducing a calibrating fluid therein.

5. A colloid osmometer comprising a body forming a solvent chamber closed to atmospheric pressure, a diaphragm mounted below the solvent chamber and forming a sealed closure for the lower end thereof, means admitting atmospheric pressure to the underside of said diaphragm, a body member forming a membrane support, said body member being mounted on the solvent chamber, a restricted passageway extending through the upper wall of the solvent chamber and said body member, a membrane element having its surface lying in a single plane and overlying said membrane support and having its outer bottom surface lying thereon, said membrane being generally centrally located with respect to said restricted passageway and projecting substantially about said passageway to provide an enlarged uniform sealing area about said restricted passageway, a container member having thickened wall portions overlying and seating upon said membrane element and said membrane support for rigidly holding said membrane against said solution chamber, said container member being formed with a vertically extending cylindrical chamber of substantially greater diameter than said restricted passageway, said chamber being axially located with respect to said restricted passageway to provide an open-ended solution container for holding a solution above said restricted passageway and concentrically thereabout, means for clamping the membrane support and solution container to seal the parts and to retain the membrane element in stiff sealed relation therebetween, a closure for the open end of said solution container, said closure member being formed with a port in normal communication with the atmosphere, whereby colloid osmotic pressures may be evaluated by movement of said diaphragm upon transfer of the solutions contained in the solvent container and the solution chamber through the restricted passageway.

6. The improved method of measuring osmotic pressure which consists in supporting within a confined space on a semipermeable membrane and at atmospheric pressure a body of solution, whose osmotic pressure is to be determined, and simultaneously containing a predetermined volume of solvent free of atmospheric pressure in contact with an opposite side of the membrane over an area substantially smaller than the diffusion area of the membrane which is in contact with the solution thereby to decrease the fluid pressure within the solvent containing chamber, and then measuring the decrease in pressure as a function of fluid displacement of the said solvent.

References Cited in the file of this patent

UNITED STATES PATENTS

| | | |
|---|---|---|
| 2,534,737 | Rose | Dec. 19, 1950 |
| 2,716,886 | Rowe | Sept. 6, 1955 |

FOREIGN PATENTS

| | | |
|---|---|---|
| 669,342 | Germany | Dec. 23, 1938 |